(12) United States Patent
Nakamura

(10) Patent No.: US 6,915,422 B1
(45) Date of Patent: Jul. 5, 2005

(54) PERSONAL IDENTIFICATION SYSTEM

(75) Inventor: Takashi Nakamura, Tokyo (JP)

(73) Assignee: Namco Ltd., Tokyo (JP)

( * ) Notice: Subject to any disclaimer, the term of this patent is extended or adjusted under 35 U.S.C. 154(b) by 600 days.

(21) Appl. No.: 09/602,595

(22) Filed: Jun. 22, 2000

(30) Foreign Application Priority Data

Jun. 23, 1999 (JP) .......................................... 11-177494

(51) Int. Cl.$^7$ ................................................ G06F 1/24
(52) U.S. Cl. ........................ 713/155; 713/168; 713/182; 713/193; 713/200; 713/201
(58) Field of Search ................................. 713/155, 168, 713/182, 193, 200, 201

(56) References Cited

U.S. PATENT DOCUMENTS 5,677,989 A    10/1997   Rabin et al.
5,883,960 A   *   3/1999   Maruyama et al. ......... 380/249

* cited by examiner

*Primary Examiner*—Thomas R. Peeso
(74) *Attorney, Agent, or Firm*—Dellett & Walters

(57) ABSTRACT

The present invention discloses a personal identification system for identifying when subscriber number data input from a mobile communication apparatus is received, a user who requests access to personal information stored in personal information storage unit based on this subscriber number data.

15 Claims, 14 Drawing Sheets

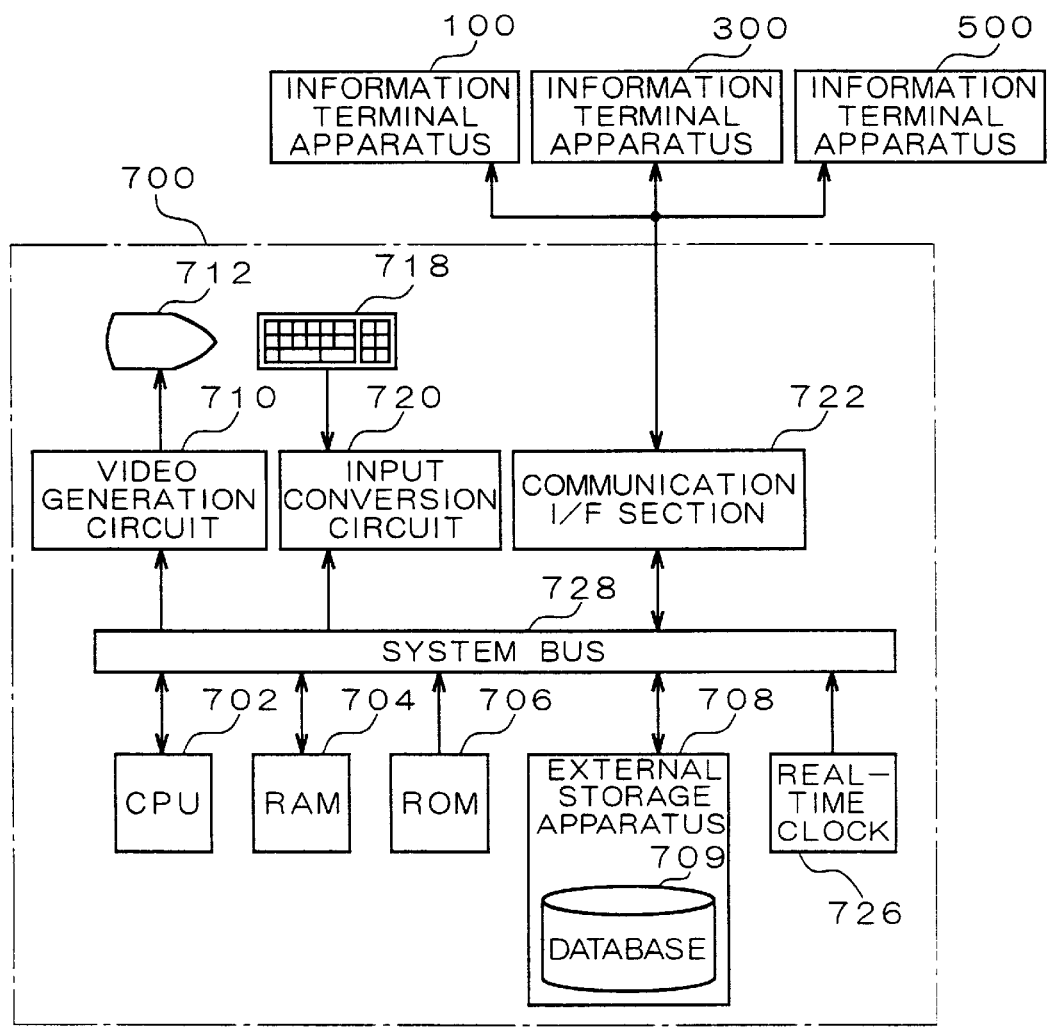

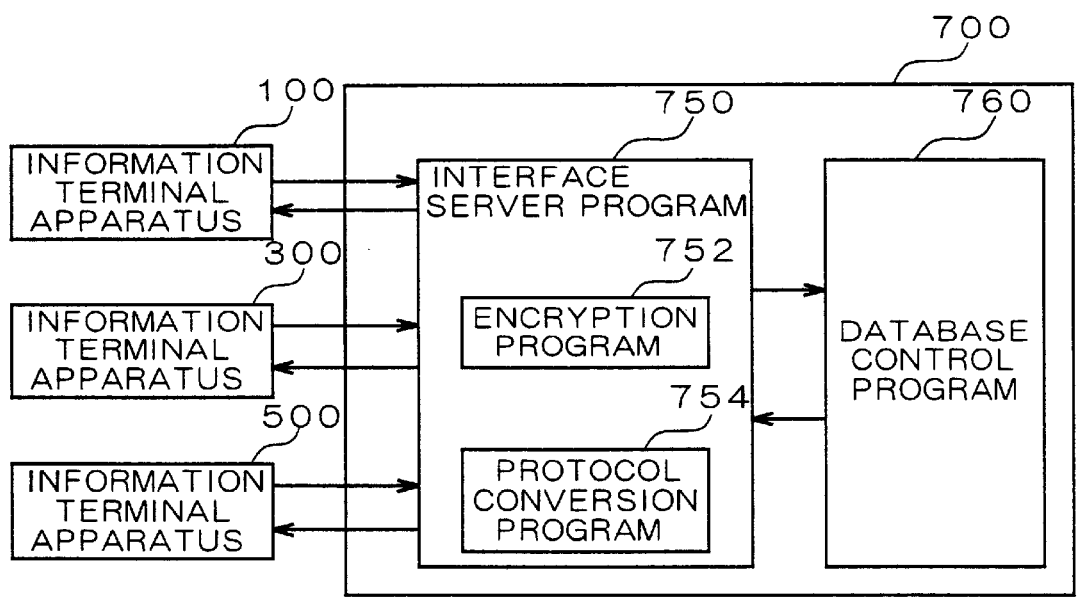

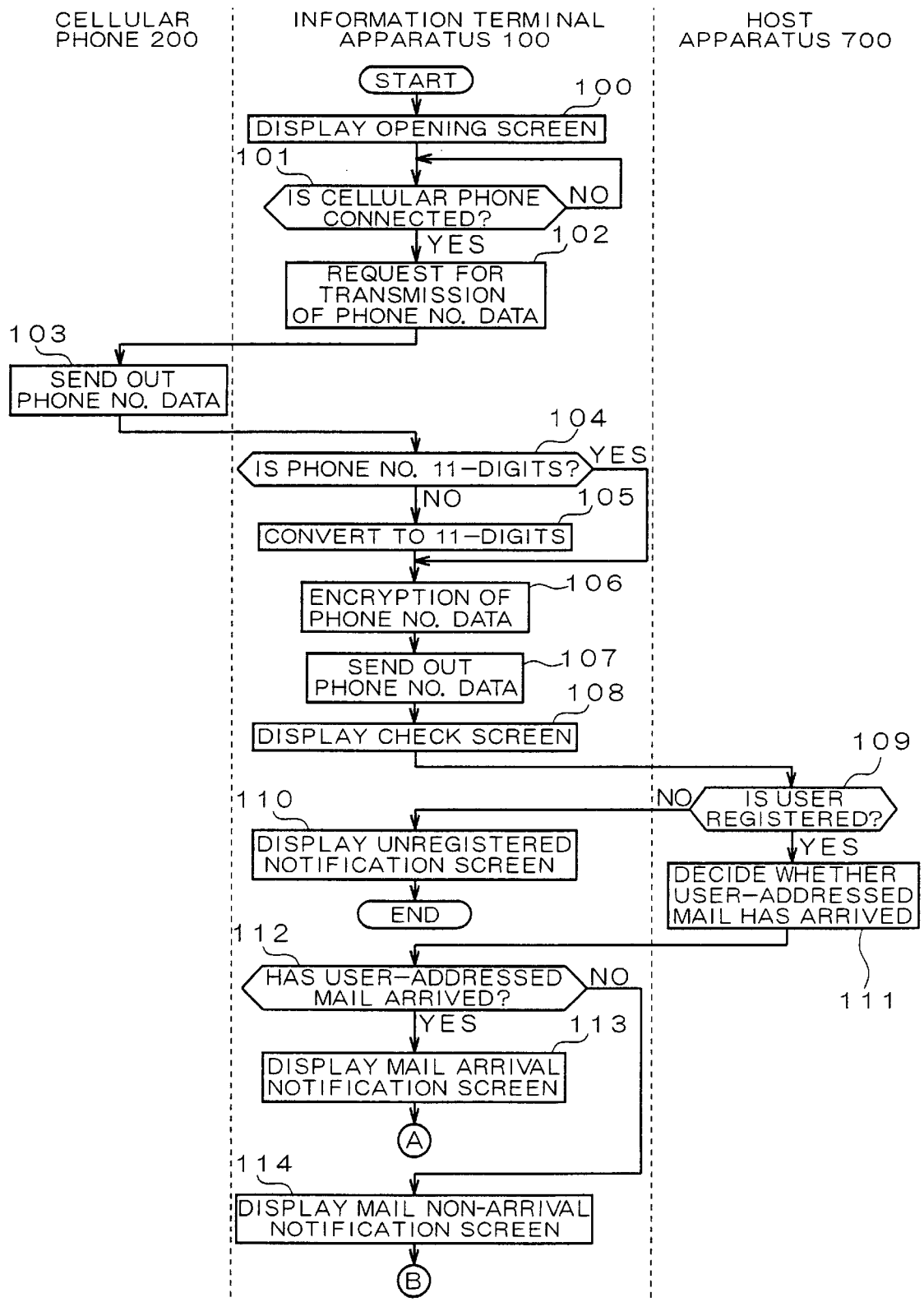

FIG. 14

| | | | | | |
|---|---|---|---|---|---|
| Read | Send | Print | Delete | Reply | Write |
| 811 | 829 812 813 | | | 814 | 815 |

810 — Hand Write (831)
Cara-cter (832)
Photo (833)
Erase (834)

To ☐ ○○○○<aaa@bb.ccc.co.jp>
Title ☐ Re:Trying to send you a mail

I have received it. — 835

| Numbers Symbols | Small Letter | Capital Letter | Hiragana | Katakana |
|---|---|---|---|---|
| あ | か | さ | た | な | は | ま | や | ら | わ |
| い | き | し | ち | に | ひ | み | ゆ | り | を |
| う | く | す | つ | ぬ | ふ | む | ゆ | る | ん |
| え | け | せ | て | ね | へ | め | | れ | ゛ |
| お | こ | そ | と | の | ほ | も | | ろ | ゜ |

| Kanji Convert | Non-Convert | Kana Convert | Convert | Enter |

From: ○○○○<aaa@bb.ccc.co.jp>
Title:Trying to send you a mail

Hello. How are you? This is ○○.
I have tried to send you a mail.
Can you receive it?
Please send me a return mail
if you could receive this message.

FOR SALE
CAMERA
¥10,000

820

PERSONAL IDENTIFICATION SYSTEM

BACKGROUND OF THE INVENTION

The present invention relates to a personal identification system for conducting personal identification when an unspecified number of users read/write or transmit/receive various kinds of information.

The recent progress made in the field of communication networks such as the Internet is remarkable and individuals can easily receive or transmit various kinds of information over these communication networks. For example, it is possible to transmit/receive e-mail by connecting an information terminal apparatus such as a personal; computer to a mail server over a public line. Furthermore, it is also possible to connect a game machine as an information terminal apparatus to a server over a public line, send a game result to the server after the game is over and store it there, and later receive the game result from the server and continue the game from the previous scene.

By the way, the above described server is connected and used by an unspecified number of users, and so the server needs to identify individual users to prevent e-mail or game result of a third party from being received. For this purpose, individual users are given user IDs. Users enter these given user IDs and passwords accompanying these user IDs and the server identifies users based on these user IDs entered.

However, it is complicated for users to enter their user IDs every time they connect to the server. In the case of an information terminal apparatus used privately, it is possible to save a user from having to enter his/her user ID for every connection by storing the user ID in memory, etc. in the information terminal apparatus. However, in the case of a game machine installed in a game center where an unspecified number of people use the machine, it is impossible to store multiple user IDs from the standpoint of preventing misuse of those IDs, and so individual users need to enter their user IDs, which causes a problem of making operations complicated.

Moreover, as a method of entering user IDs, it is possible to let users carry IC cards storing their IDs, provide a card reader for the information terminal apparatus and let the users enter their passwords by inserting the IC cards into the card reader. In this case, those IC cards must be distributed to individual users and a card reader must be provided for the information terminal apparatus, which will increase the cost.

Furthermore, irrespective of whether a user directly enters his/her user ID or password or such information is automatically read from the IC card the user carries, it is necessary to control this information so that user IDs and passwords given to different users do not overlap each other.

SUMMARY OF THE INVENTION

The present invention has been implemented taking into account the points described above and it is an object of the present invention to provide a personal identification system capable of simplifying user operations for personal identification, reducing the cost required for personal identification and eliminating the need for complicated control of user IDs, etc.

In order to solve the above described problems, the personal identification system of the present invention receives subscriber number data allotted to a mobile communication apparatus through subscriber number acquisition unit, stores predetermined personal information in personal information storage unit and identifies a user requesting access to the personal information based on the subscriber number data received through subscriber number acquisition unit by user identification unit.

A subscriber number of a mobile communication apparatus such as a cellular phone is specific to each mobile communication apparatus and no identical subscriber number is given to a plurality of mobile communication apparatuses, and it is therefore possible to identify a user who requests access to personal information storage unit based on this subscriber number. Thus, it is possible to identify users based on their subscriber numbers without the need for providing user IDs to individual users. Moreover, using subscriber number data sent from a mobile communication apparatus makes it possible to acquire the subscriber number data without requiring the user to enter the subscriber number, thus saving the user time and trouble for operations. This also eliminates the need for providing an IC card that records the user ID and its reader as in the conventional case, which contributes to cost reduction.

It is particularly desirable that an information terminal apparatus be provided with the above described subscriber number acquisition unit, and a host apparatus be provided with the personal information storage unit and user identification unit. When the information terminal apparatus accesses the personal information stored in the host apparatus, the user for whom access is permitted needs to be identified and this personal identification can be done using the subscriber number data as shown above, and in this way it is possible to easily simplify operations and reduce the cost on the information terminal apparatus side.

Moreover, identifying a user who demands to read personal information stored in the personal information storage unit or a user who demands to write personal information to the personal information storage unit can prevent an unauthorized third party from reading or tampering the personal information stored in the personal information storage unit.

It is further desirable that predetermined registration information including subscriber number data be stored in registration information storage unit, and user identification unit check the subscriber number acquired by the subscriber number acquisition unit against the subscriber number included in the registration information stored in the registration information storage unit to identify the user. This makes it possible to easily decide whether the user requesting the access is registered or not.

Moreover, if no registration information corresponding to the user is stored in the registration information storage unit, it is desirable to add the registration information corresponding to the user through registration information adding unit. This allows a new user to be registered and to access the personal information storage unit.

Furthermore, if the number of digits of the subscriber number data received by the mobile communication apparatus is different from the number of digits of the subscriber number system at that time, it is desirable to convert the number of digits to the number of digits of the subscriber number system at that time through subscriber number conversion unit. The number of digits of a subscriber number of a mobile communication apparatus may be changed as the number of subscribers increases. Since an old type mobile communication apparatus retains the subscriber number data before the number of digits is changed, converting the number of digits to the number of digits of the subscriber number system at that time allows two telephone number data pieces with different number of digits but with the same content to be treated as being the same.

It is desirable to display the personal information of a user identified by the user identification unit on the above described information terminal apparatus through personal information display unit. When a user checks personal information by operating an information terminal apparatus installed in a place where an unspecified number of users have access, this facilitates selectively displaying only the personal information of this user to the identified users.

It is further desirable to encrypt data transmitted/received between the above described information terminal apparatus and host apparatus using encryption unit. Various kinds of data such as personal information transmitted/received over a network can leak out, but encrypting this information can prevent its content from being read by a third party.

It is also desirable to send advertising information to the user through advertising information notification unit in the information terminal apparatus taking advantage of a waiting time until the data sent from the above described host apparatus is received. Since identifying a user or accessing personal information takes time and the user watches the display screen, etc. all this while, it is easy to attract the attention of the user to the advertising information, thus providing high advertising effects.

BRIEF DESCRIPTION OF THE DRAWINGS

FIG. 3 illustrates a hardware configuration of a host apparatus;

FIG. 4 illustrates an example of registration information data;

FIG. 5 illustrates a software configuration of the host apparatus;

FIG. 6 is a flow chart showing a flow of an operation procedure of the data transmission/reception system;

FIG. 14 illustrates an example of a mail detail screen when reply e-mail is created;

DETAILED DESCRIPTION OF THE PREFERRED EMBODIMENTS

Figure 1:
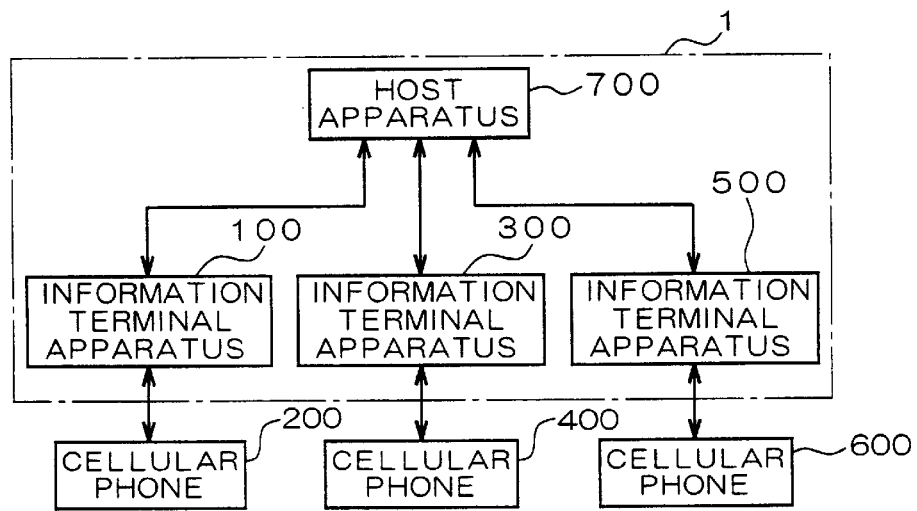
FIG. 1 illustrates a hardware configuration of a data transmission/reception system of an embodiment.

With reference now to the attached drawings, a data transmission/reception system using a personal identification system according to an embodiment of the present invention will be explained in detail below. FIG. 1 illustrates a hardware configuration of the data transmission/reception system of this embodiment. The data transmission/reception system 1 shown in the figure is configured by including information terminal apparatuses 100, 300 and 500, a host apparatus 700 and the information terminal apparatuses 100, 300 and 500 are connected with the host apparatus 700 over a public line as a network. This data transmission/reception system 1 is used to transmit/receive e-mail as personal information by identifying the owner (hereinafter referred to as "user") of a cellular telephone 200, etc. based on subscriber numbers (telephone numbers) given to cellular phones 200, 400 and 600 as mobile communication apparatuses.

Figure 2:
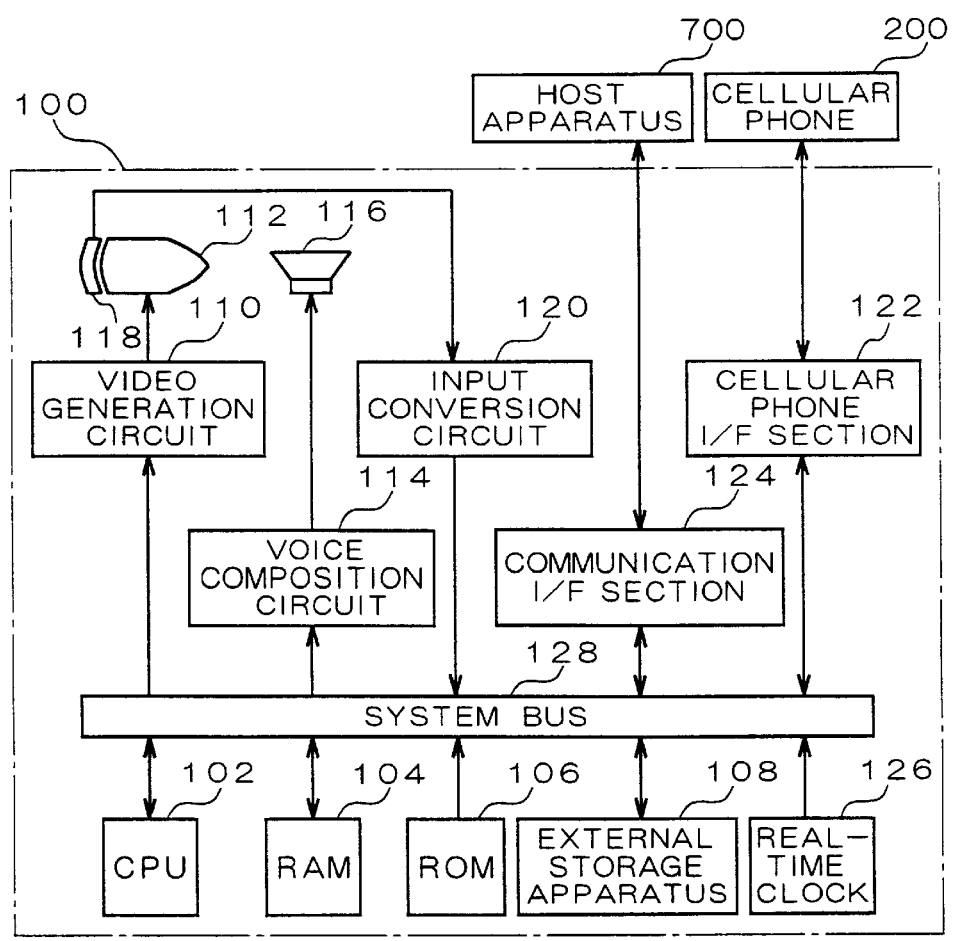
FIG. 2 illustrates a hardware configuration of an information terminal apparatus.

FIG. 2 illustrates a hardware configuration of the information terminal apparatus 100. The information terminal apparatus 100 shown in the figure is installed, for example, in a game center shop, accessible to an unspecified number of people. This information terminal apparatus 100 is configured by including a CPU 102, a RAM 104, a ROM 106, an external storage apparatus 108, a video generation circuit 110, a display apparatus 112, a voice composition circuit 114, a voice output apparatus 116, an input apparatus 118, an input conversion circuit 120, a cellular telephone interface (I/F) section 122, a communication interface (I/F) section 124, a real-time clock 126 and a system bus 128. The other information terminal apparatuses 300 and 500 have configurations similar to that of the information terminal apparatus 100.

The CPU 102 reads and executes a program stored in the ROM 106 or reads a program stored in the external storage apparatus 108 and temporarily stores the program in the RAM 104 and controls the entire information terminal apparatus 100 by carrying out various kinds of operations by executing the program stored in this RAM 104.

More specifically, the CPU 102 executes processing to output a request for transmission of telephone number data to the cellular phone 200 connected to the information terminal apparatus 100 and to receive the telephone number data output from the cellular phone 200 in response to the transmission request. Furthermore, the CPU 102 sends the telephone number data acquired from the cellular phone 200 in this way to the host apparatus 700 and decides whether any e-mail addressed to the user (user-addressed mail) identified by this telephone number data has arrived at the host apparatus 700.

Before sending the telephone number data to the host apparatus 700, the CPU 102 analyzes the number of digits of the telephone number, and if the number of digits is different from that of the subscriber number system, the CPU 102 converts the number of digits to that of the current subscriber number system. For example, in the following explanation, suppose the number of digits of the current subscriber number system is 11 digits and the CPU 102 decides whether the number of digits of the telephone number is 11 digits or not, and if it is not 11 digits (the case where it is 10 digits) the CPU 102 converts it to 11 digits.

Furthermore, when sending the telephone number data to the host apparatus 700, the CPU 102 executes encryption processing on the telephone number data and sends the encrypted telephone number data. As the encryption processing system, there are a public key encryption system and common key encryption system, etc.

If user-addressed mail has arrived at the host apparatus 700, the CPU 102 outputs a command to create a screen for notifying that the user-addressed mail has arrived (mail arrival notification screen) to the video generation circuit 110. The CPU 102 further decides whether a coin has been inserted into a coin slot (not shown in the figure) provided for the information terminal apparatus 100 or not. If a coin has been inserted, the CPU 102 outputs a command to send mail to the host apparatus 700. When the host apparatus 700 sends the user-addressed mail in response to this command, the CPU 102 carries out decryption processing on this encrypted user-addressed mail and outputs a command to create a screen for displaying a user-addressed mail list, its content or e-mail creation form (mail detail screen) to the video generation circuit 110.

If no user-addressed mail has arrived at the host apparatus 700, the CPU 102 outputs a command to create a screen to notify that no user-addressed mail has arrived (mail non-arrival notification screen) to the video generation circuit 110. Moreover, when the user in operation is not registered in the data transmission/reception system 1, the CPU 102 outputs a command to create a screen for notifying that the user is not registered (unregistered notification screen) to the video generation circuit 110.

With the above described mail detail screen displayed, if e-mail is created by the user and transmission of the e-mail is commanded, the CPU 102 carries out encryption processing on the e-mail and sends it to the host apparatus 700.

The video generation circuit 110 generates predetermined video according to various video generation commands output from the CPU 102. The video generated is displayed on the display apparatus 112. The voice composition circuit 114 composes predetermined voice according to voice generation commands output from the CPU 102. The composed voice is output from the voice output apparatus 116 configured by a speaker, etc.

The input apparatus 118 is for the user to input various operation commands and is configured by, for example, a touch panel placed on the screen of the display apparatus 112.

The input conversion circuit 120 detects a position at which the user touches the touch panel as the input apparatus 118 with an operation pen (not shown in the figure) or his/her finger, etc. and generates touch position data to identify the touch position. The CPU 102 decides the content of the operation command of the user based on this touch position data and carries out operation processing corresponding to the operation command.

The cellular telephone I/F section 122 is used to connect the cellular phone 200 via a predetermined cable and has a connection section by a connector (not shown in the figure). For example, if various data is input/output in a serial data format, parallel data handled in the information terminal apparatus 100 and this serial data are mutually converted. The communication I/F section 124 is used to transmit/receive various data to/from the host apparatus 700. For example, if a general ISDN line is used as the public line, the communication I/F section 124 carries out physical line connection necessary to perform data transmission/reception to/from the ISDN line and protocol control necessary for data communications as well.

The real-time clock 126 is used to supply the CPU 102, etc. with time data. For example, when sending e-mail, time data supplied by this real-time clock 126 is used as transmission time data.

FIG. 3 illustrates a hardware configuration for the host apparatus 700. The host apparatus 700 shown in the figure is configured by including a CPU 702, a RAM 704, a ROM 706, an external storage apparatus 708, a video generation circuit 710, a display apparatus 712, an input apparatus 718, an input conversion circuit 720, a communication interface (I/F) section 722, a real-time clock 726 and a system bus 728.

The CPU 702 reads and executes a program stored in the ROM 706 or reads a program stored in the external storage apparatus 708 and temporarily stores the program in the RAM 704 and controls the entire host apparatus 700 by carrying out various kinds of operations by executing the program stored in this RAM 704.

More specifically, the CPU 702 carries out decryption processing on various encrypted data sent from the information terminal apparatus 100, etc. and carries out encryption processing on various data to be sent to the information terminal apparatus 100, etc. Furthermore, upon reception of e-mail sent from the information terminal apparatus 100, etc., the CPU 702 stores this in a database 709 formed in the external storage apparatus 708. Moreover, upon reception of telephone number data of the cellular phone 200, etc. from the information terminal apparatus 100, etc., the CPU 702 checks whether there is registration information corresponding to this telephone number data received and thereby decides whether the user identified by this telephone number data is registered or not.

FIG. 4 illustrates an example of registration information. As shown in FIG. 4, the registration information contains various data such as a telephone number, age, sex, and e-mail address. The CPU 702 compares the telephone number data received from the information terminal apparatus 100, etc. with the telephone number data included in the above registration information, and if registration information with the matched telephone number data exists, the CPU 702 decides that the user has already been registered.

As in the case of the above described video generation circuit 110, the video generation circuit 710 generates predetermined video according to various video generation commands output from the CPU 702. The generated video is displayed on the display apparatus 712.

The input apparatus 718 is used for the administrator of the data transmission/reception system 1 (hereinafter simply referred to as "administrator") to input various kinds of information and is configured by, for example, a keyboard. When the administrator operates the input apparatus 718, the input conversion circuit 720 outputs a predetermined signal according to the content of this operation. For example, if the input apparatus 718 is configured by a keyboard, various kinds of code data such as character code and control code corresponding to the key pressed down by the administrator is output.

The communication I/F section 722 is used to transmit/receive various data to/from the information terminal apparatuses 100, 300 and 500 connected over a public line. For example, if a general ISDN line is used as the public line, the communication I/F section 722 carries out physical line connection necessary to perform data transmission/reception to/from the ISDN line and protocol control necessary for data communications as well. The real-time clock 726, like the real-time clock 126 above, is used to supply the CPU 702, etc. with time data.

FIG. 5 illustrates a software configuration of the host apparatus 700. As shown in the figure, the host apparatus 700 is configured by including an interface server program 750 and database control program 760.

The interface server program 750 includes an encryption program 752 and a protocol conversion program 745. The encryption program 752 is used to carry out encryption and decryption processing on various kinds of transmission/reception data, and carries out encryption processing on user-addressed mail to be sent to the information terminal apparatus 100, etc. and decryption processing on telephone number data and e-mail, etc. received from the information terminal apparatus 100, etc.

The protocol conversion program 754 is used to mutually adjust the format of data handled in the host apparatus 700 with the format of data transmitted/received between the information terminal apparatuses 100, 300 and 500 and the host apparatus 700. When the host apparatus 700 sends various data such as user-addressed mail to the information terminal apparatus 100, etc., this protocol conversion program 754 creates transmission data with a format according to a predetermined communication protocol. Furthermore, when various data such as telephone number data is sent from the information terminal apparatus 100, etc. to the host apparatus 700, the protocol conversion program 754 extracts the telephone number data, etc. with additional information such as destination addresses necessary for communication eliminated from the received communication data.

The database control program 760 is used to control the database 709 and performs processing such as data update, search or data recovery when a power failure or other fault occurs. For example, the database control program 760 creates, updates or deletes registration information for every user shown in FIG. 4, and if user-addressed e-mail exists, controls the storage address of this e-mail in correspondence with the registration information.

The above described CPU 102 and cellular telephone I/F section 122 correspond to the subscriber number acquisition unit; the CPU 102 corresponds to the subscriber number conversion unit and encryption unit; the CPU 102, video generation circuit 110 and display apparatus 112 correspond to the advertising information notification unit; the CPU 702 corresponds to the user identification unit; and the database 709 corresponds to the personal information storage unit and registration information storage unit.

The data transmission/reception system 1 applying the present invention has the configuration described above and its operation will be explained below. For example, in the following explanation suppose a cellular phone 200 is connected to the information terminal apparatus 100.

FIG. 6 illustrates a flow chart showing the flow of an operation procedure of the data transmission/reception system 1 and shows operations of the information terminal apparatus 100, cellular phone 200 and host apparatus 700.

Figure 7:
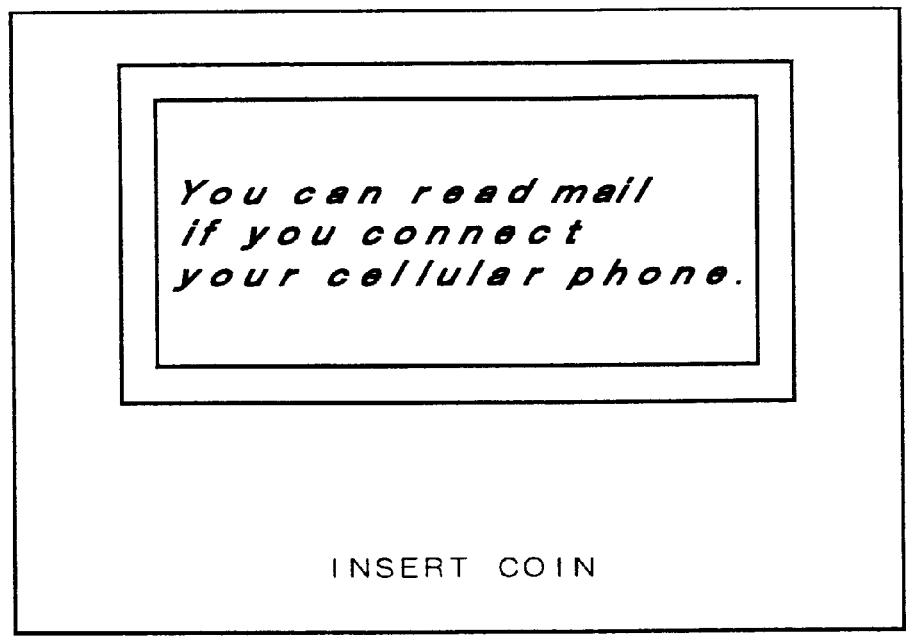
FIG. 7 illustrates an example of an opening screen.

The CPU 102 in the information terminal apparatus 100 outputs a command to create an opening screen to the video generation circuit 110. The video generation circuit 110 creates an opening screen in response to this command and displays it on the display apparatus 112 (step 100). FIG. 7 illustrates an example of the opening screen. As shown in the figure, the opening screen shows a character string "You can read mail if you connect your cellular phone", which is a message to urge the user to connect the cellular phone 200 and read e-mail.

Then, the CPU 102 decides whether the cellular phone 200 is connected or not (step 101). When the cellular phone 200 is connected to the cellular telephone I/F section 122 via a predetermined cable, a connection detection signal is sent from the cellular phone 200 to the cellular telephone I/F section 122, and when the CPU 102 detects this connection detection signal, the CPU 102 makes an affirmative decision in step 101 above.

Then, the CPU 102 sends a request for transmission of the telephone number data to the cellular phone 200 connected (step 102). Upon reception of this transmission request, the cellular phone 200 reads the own telephone number data from an internal memory, which is not shown in the figure, sends it to the information terminal apparatus 100 (step 103) and this cellular telephone number data is received by the cellular telephone I/F section 122.

Then, the CPU 102 analyzes this telephone number data and decides whether the number of digits of the telephone number is 11 or not (step 104). If the number of digits of the telephone number is not 11, the CPU 102 converts the telephone number to an 11-digit number (step 105). For example, if some users use cellular phones manufactured before the subscriber number system was changed to the current 11-digit system, the internal memory of that cellular phone stores 10-digit cellular telephone number data, and so this 10-digit telephone number is converted to 11 digits, which is the current subscriber number system. After deciding that the telephone number is 11 digits or after the telephone number is converted to 11 digits, the CPU 102 carries out encryption processing on the telephone number data. (step 106) and sends it to the host apparatus 700 over a public line (step 107).

Figure 8:
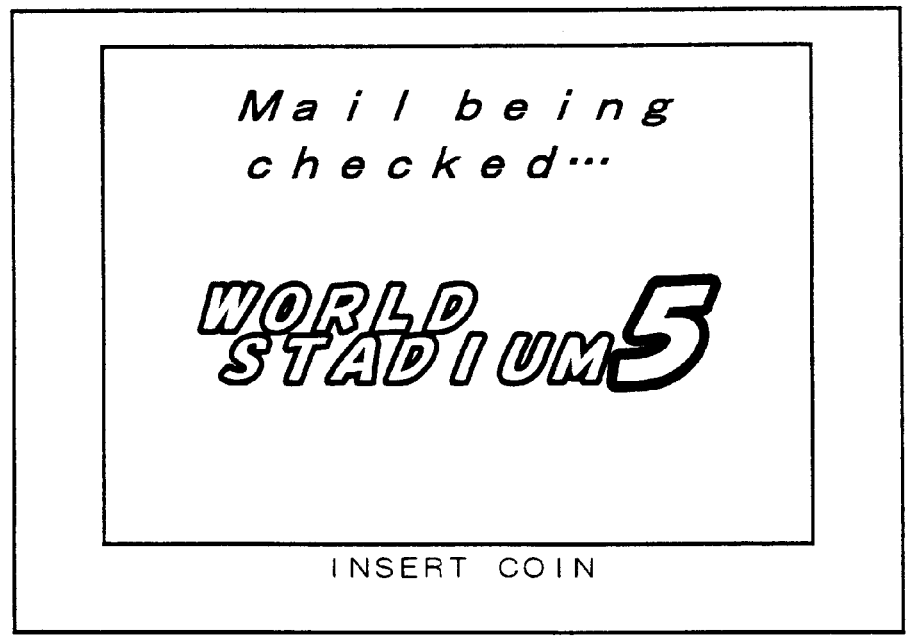
FIG. 8 illustrates an example of a check screen.

Then, the CPU 102 outputs a command to create a check screen that will be displayed while checking whether the user-addressed mail has arrived at the host apparatus 700 to the video generation circuit 110. In response to this command, the video generation circuit 110 creates a check screen and displays it on the display apparatus 112 (step 108). FIG. 8 illustrates an example of the check screen. As shown in the figure, the check screen includes a character string "Mail being checked", which is a message to check whether any user-addressed mail has arrived or not. Since it takes certain time (for example, over ten seconds) after checking whether the user-addressed mail has arrived at the host apparatus 700 or not until the information terminal apparatus 100 receives the result, the present embodiment includes a predetermined advertising image on the check screen above to alleviate the tedium in the meantime. For example, the check screen shown in FIG. 8 includes an advertising area indicating that a game program called "World Stadium. 5" is on sale.

Figure 9:
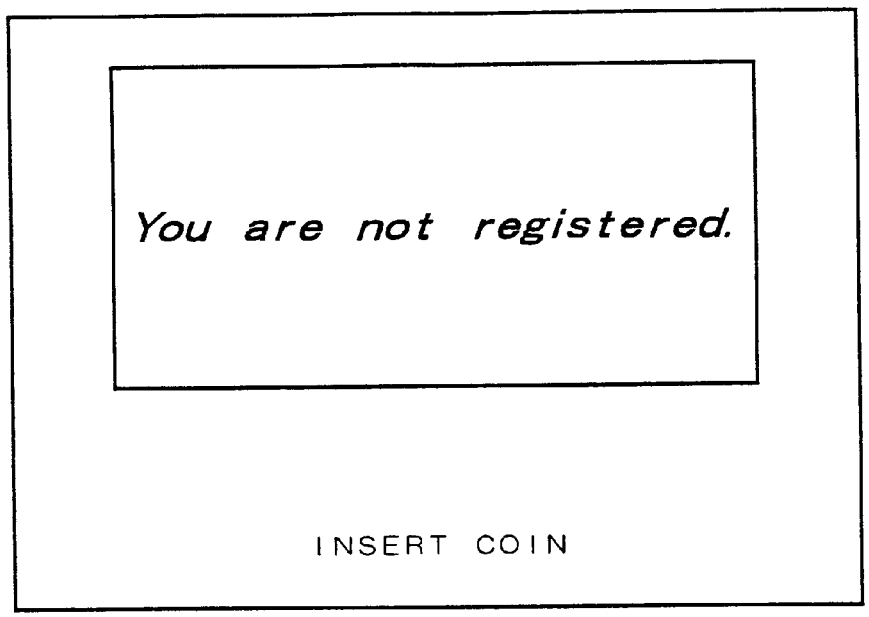
FIG. 9 illustrates an example of an unregistered notification screen.

Upon reception of the telephone number data sent from the information terminal apparatus 100 via the communication I/F section 722 in the host apparatus 700, the CPU 702 in the host apparatus 700 checks whether the registration information on the user identified by this received telephone number data is stored in the database 709 or not and decides whether this user is already registered or not (step 109). If not registered, the CPU 702 sends the decision result to the information terminal apparatus 100. Then, in response to this decision result, the CPU 102 in the information terminal apparatus 100 outputs a command to create an unregistered notification screen to the video generation circuit 110. The video generation circuit 110 creates an unregistered notification screen according to this command, displays it on the display apparatus 112 (step 110) and a series of operations ends. FIG. 9 illustrates an example of the unregistered notification screen. As shown in FIG. 9, the unregistered notification screen includes a character string "You are not registered", which is a message indicating that the user is not registered.

If the user is already registered (when an affirmative decision is made in step 109), the CPU 702 decides whether the user-addressed mail has arrived or not and sends the decision result to the information terminal apparatus 100 (step 111). Then, the CPU 102 in the information terminal apparatus decides whether the user-addressed mail has arrived at the host apparatus 700 based on this decision result (step 112).

Figure 10:
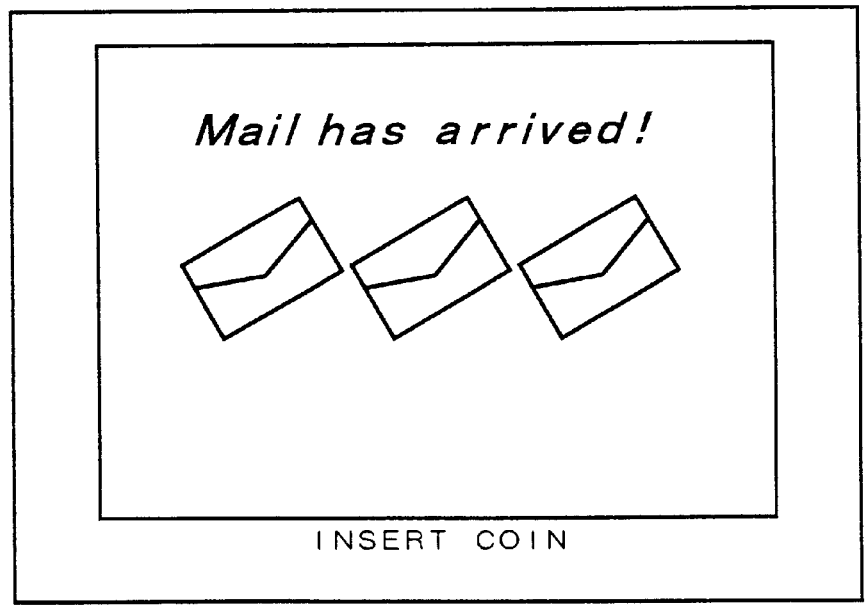
FIG. 10 illustrates an example of a mail arrival notification screen.

If the user-addressed mail has arrived at the host apparatus 700, the CPU 102 outputs a command to create a mail arrival notification screen to the video generation circuit 110. In response to this command, the video generation circuit 110 creates a mail arrival notification screen and displays it on the display apparatus 112 (step 113). FIG. 10 illustrates an example of the mail arrival notification screen. As shown in the figure, the mail arrival notification screen includes a character string "Mail has arrived!" which is a message indicating that user-addressed mail has arrived.

Figure 11:
FIG. 11 illustrates an example of a mail non-arrival notification screen.

On the other hand, if the user-addressed mail has not arrived at the host apparatus 700, the CPU 102 outputs a command to create a mail non-arrival notification screen to the video generation circuit 110. In response to this command, the video generation circuit 110 creates a mail non-arrival notification screen and displays it on the display apparatus 112 (step 114). FIG. 11 illustrates an example of the mail non-arrival notification screen. As shown in the figure, the mail non-arrival notification screen includes a character string "No mail has arrived! " which is a message indicating that no user-addressed mail has arrived.

Figure 12:
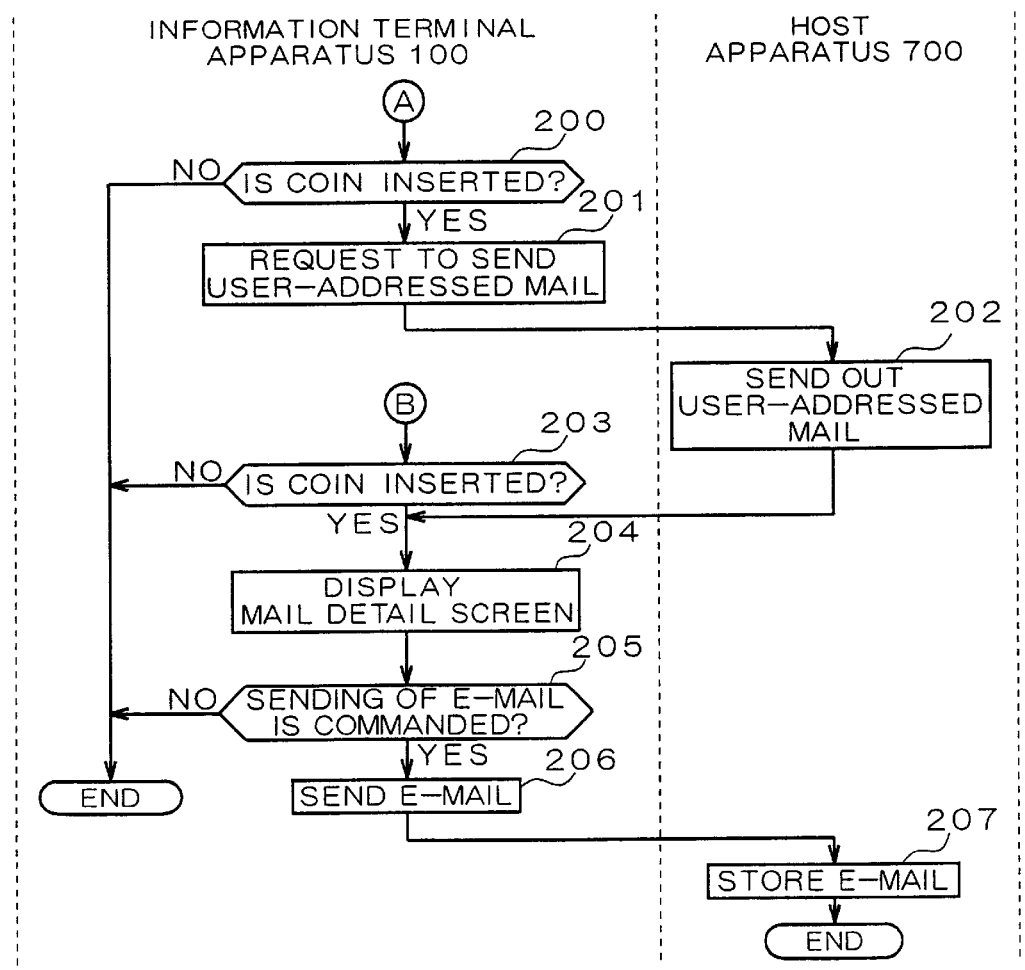
FIG. 12 is a flow chart showing a flow of an operation procedure of the data transmission/reception system after a mail arrival notification screen or a mail non-arrival notification screen is displayed.

FIG. 12 is a flow chart showing a flow of an operation procedure of the data transmission/reception system 1 after a mail arrival notification screen or mail non-arrival notification screen has been displayed and shows operations of the information terminal apparatus 100 and the host apparatus 700.

When a mail arrival notification screen is displayed on the display apparatus 112, the CPU 102 in the information terminal apparatus 100 decides whether a coin is inserted into the coin slot provided for the information terminal apparatus 100 or not (step 200). As shown in FIG. 10, there is an area of the mail arrival notification screen which shows a character string "INSERT COIN", which is a message urging the user to insert a coin and the user needs to deposit a coin into the coin slot (not shown in the figure) according to this message to see the content of the user-addressed mail. If no coin is inserted after a lapse of a predetermined time after the mail arrival notification screen is displayed, a series of operations ends. If a coin is deposited within the predetermined time after the mail arrival notification screen is displayed, the CPU 102 requests the host apparatus 700 to send data necessary to display the content of the user-addressed mail (step 201).

Upon reception of this data transmission request, in response to this request, the CPU 702 in the host apparatus 700 executes processing to read the data of the corresponding user-addressed mail from the database 709 and to send this data to the information terminal apparatus 100 via the communication I/F section 722 (step 202). The CPU 102 in the information terminal 100 receives the data sent from the host apparatus 700 via the communication I/F section 124, temporarily stores the data in the RAM 104 and outputs a command to generate a mail detail screen based on the reception data to the video generation circuit 110. The video generation circuit 110 generates a mail detail screen according to this command and displays it on the display equipment 112 (step 204).

Also, when a mail non-arrival notification screen is displayed on the display apparatus 112, the CPU 102 decides whether or not a coin has been inserted in the coin slot (step 203). Like the mail arrival notification screen, as shown in FIG. 11, a character string "INSERT COIN" which is a message urging the user to insert a coin is displayed in an area of the mail non-arrival notification screen, and to create e-mail addressed to another user, it is necessary to user to insert a coin into the coin slot according to this message. If no coin is inserted after a lapse of a predetermined time after the mail non-arrival notification screen is displayed, a series of operation ends. If a coin is inserted within a predetermined time after the mail non-arrival notification screen is displayed, the CPU 102 outputs a command to generate a mail detail screen to the video generation circuit 110. The video generation circuit 110 generates a mail detail screen according to this command and displays it on the display apparatus 112 (step 204).

Figure 13:
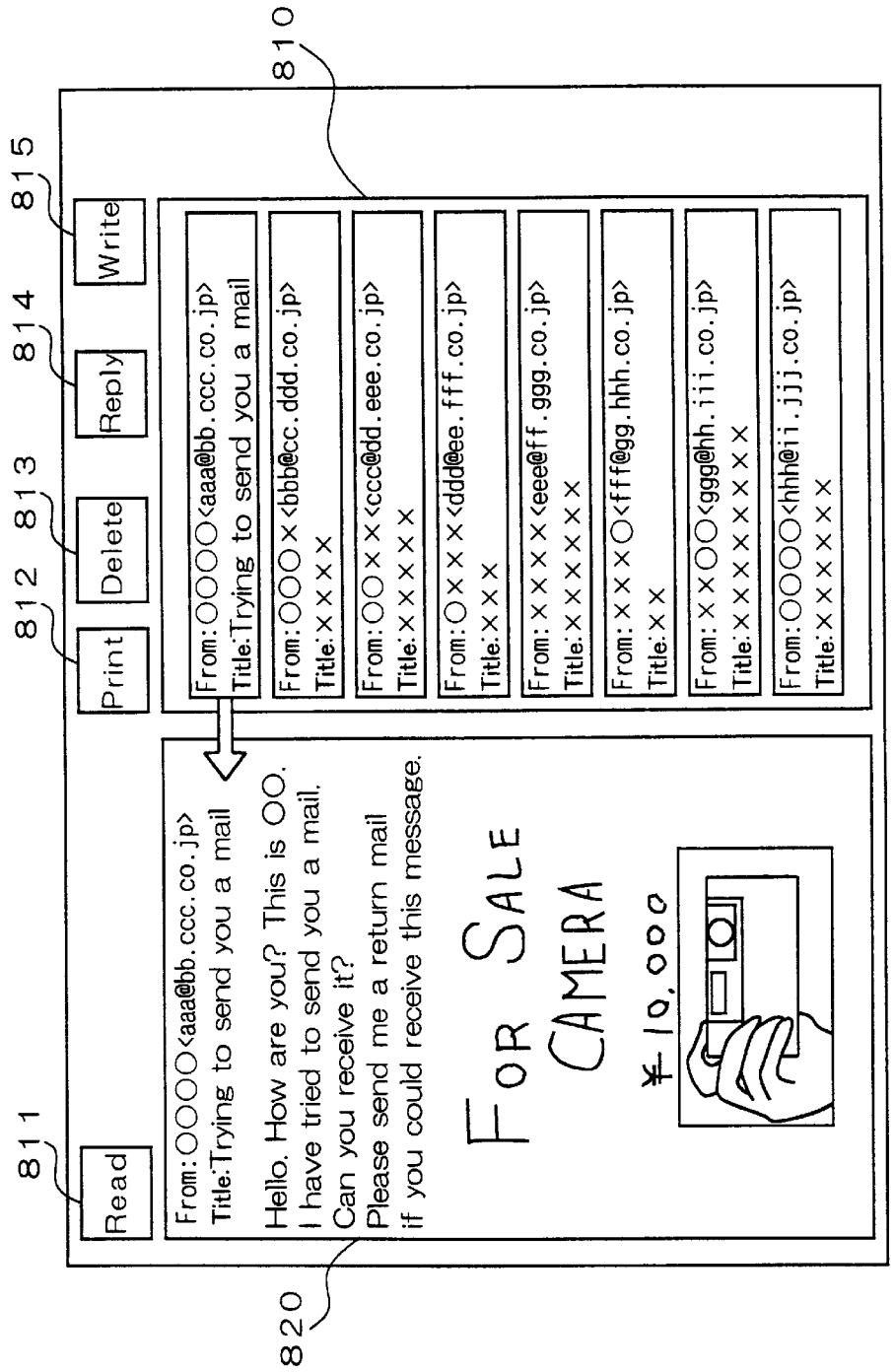
FIG. 13 illustrates an example of a mail detail screen upon reception of user-addressed mail.

FIG. 13 illustrates an example of the mail detail screen, which is displayed when user-addressed mail is received. Immediately after receiving user-addressed mail from the host apparatus 700, an area 810 of a list of received user-addressed mail is displayed in the right half area of the screen as shown in the same figure. This list area 810 shows a list of the names and mail addresses of the senders and titles of the user-addressed mail received in order from the latest to oldest. The user can choose any one piece of user-addressed mail the user wants to view by touching its corresponding area using a predetermined operation pen (not shown in the figure) or his/her finger, etc. If no user-addressed mail has been received, the list area 810 above is not included in the mail detail screen displayed.

Also, at the top of the mail detail screen, a "Read" button 811 which is chosen when displaying the content of the user-addressed mail, a "Print" button 812 which is chosen when printing the content of the user-addressed mail, a "Delete" button 813 which is chosen when disposing of the user-addressed mail, a "Reply" button 814 which is chosen when creating reply e-mail to the sender of the user-addressed mail, and a "Write" button 815 which is chosen when creating e-mail to other than the sender of the user-addressed mail are displayed. The user can choose a desired operation by touching these buttons with the operation pen, etc.

For example, if the user touches the "Read" button 811 after choosing one piece of mail from the user-addressed mail list contained in the list area 810, the content 820 of the user-addressed mail which is chosen in the left half area of the mail detail screen is displayed as shown in FIG. 13.

Then, when the user further touches the "Reply" button 814, the content of the mail detail screen is partially updated as shown in FIG. 14. The "Send" button 829 that is chosen when transmitting e-mail is added to part of this updated mail detail screen and the right half area switches over to an e-mail creation area (the mail creation area) 830. An "Address" which becomes the destination address of the e-mail and a "Title" which shows an overview of the content are contained in the upper part of the e-mail creation area 830.

In the right margin of the screen, a "Handwrite" button 831 which is chosen when inputting by handwriting, a "Character" button 832 which is chosen when inputting characters, a "Photo" button 833 which is chosen when taking in a photograph and an "Erase" button 834 which is chosen when erasing characters entered are newly displayed. The user can choose a desired operation by touching these buttons with the operation pen and his/her finger, etc.

If, for example, the "Character" button is chosen by the user, as shown in FIG. 14, a "Character type" button to choose a character type such as numbers and symbols, capital or small letters of alphabets, hiragana and katakana is displayed in the mail creation area 830. Also, a character list that corresponds to the chosen character type is displayed in the mail creation area 830. If the character type of hiragana or katakana is selected, a "Character conversion" button when converting kanji and an "Enter" button to confirm the character conversion are displayed in addition to the character list. When the user touches one "Character type" button to select one character type and touches one arbitrary character from the character list, the characters are entered in a predetermined display position. Furthermore, when performing kanji conversion with the character type of hiragana or katakana selected, selecting the "Character conversion" button after entering characters displays kanji candidates corresponding to the character strings entered so far. If the displayed kanji is different from the one that the user wants to enter, the user can touch the "Character conversion" button again to display another kanji character as the next candidate until the desired kanji character is displayed. Selecting the "Enter" button with the desired kanji displayed confirms the content of the character conversion. In this way, character strings corresponding to the text of the e-mail to be sent are entered one by one starting from the middle position of the mail creation area 830. Also for the address and title included in the upper part of the mail creation area 830, desired character strings are entered in the same way as for the text of the e-mail.

Figure 15:
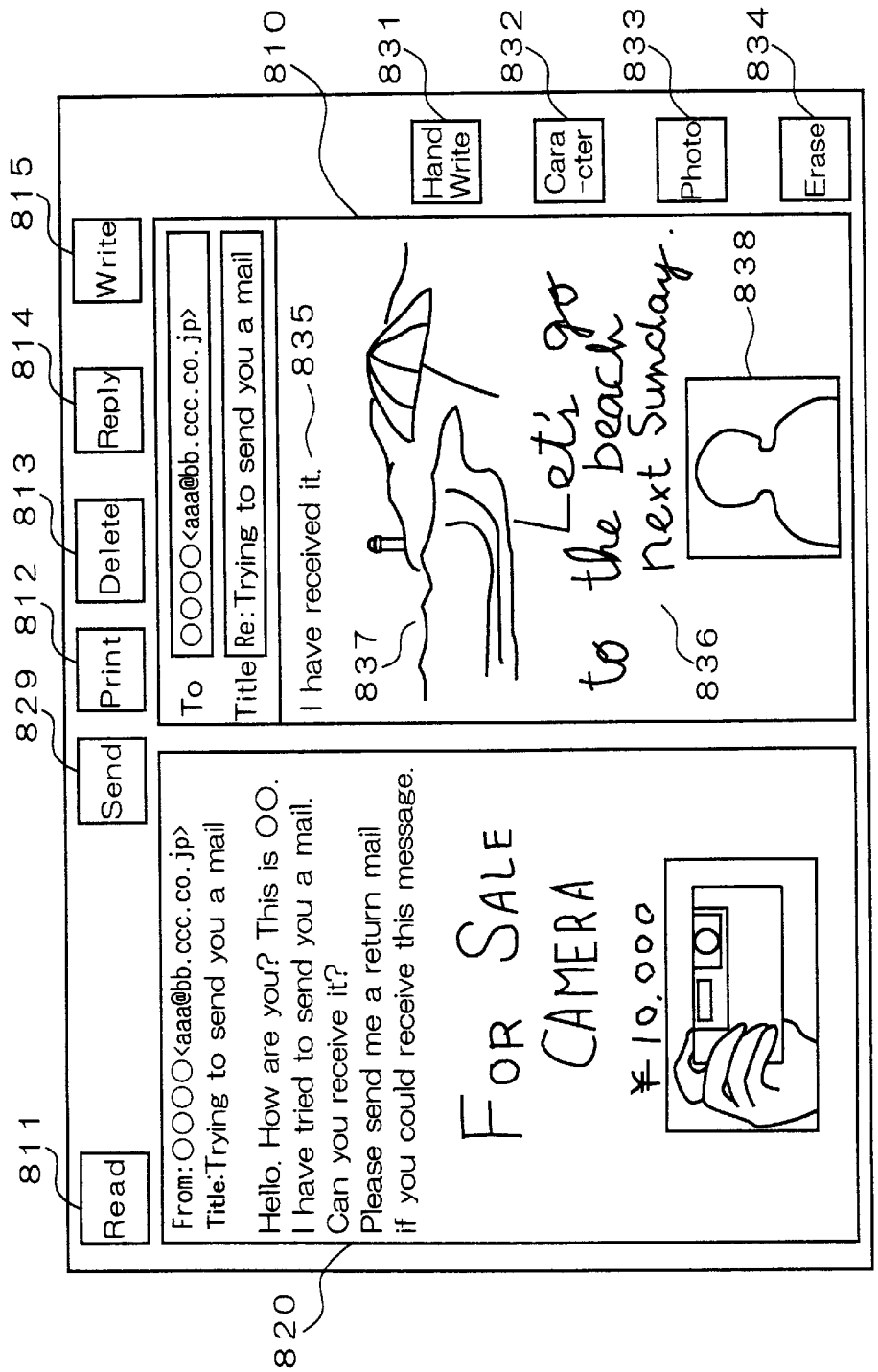
FIG. 15 illustrates an example of a mail detail screen that displays reply e-mail.

Moreover, when the user selects the "Handwrite" button 831, if the user traces the surface of the input apparatus 118 using the operation pen or his/her finger, etc., their trails are incorporated through the input conversion circuit 120 as handwritten characters or handwritten image. FIG. 15 shows a handwritten characters 836 and handwritten image 837 incorporated in this way.

On the other hand, if the user selects the "Photo" button 833, a photo taken by a camera (not shown in the figure) provided for the information terminal apparatus 100 is incorporated at predetermined timing. Then, as shown in FIG. 15, the captured photo 838 is displayed in the mail creation area 830. This photo 838 can be freely moved within the mail creation area 830 by the user dragging it, etc. The various character strings, handwritten characters, image and photo entered in the mail creation area 830 are temporarily stored in the RAM 104.

After the above described mail detail screen is displayed, the CPU 102 decides whether the "Send" key 829 displayed on the mail detail screen is selected and transmission of the created e-mail is commanded or not (step 205). If the user ends the operation without commanding transmission of thee-mail, a series of operations ends. If transmission of the e-mail is commanded, the CPU 102 executes processing to read the data of the created e-mail from the RAM 104 and to carry out predetermined encryption processing, and then to send it to the host apparatus 700 via the communication I/F section 124 (step 206). Then, upon reception of this e-mail sent from the information terminal apparatus 100, the CPU 702 in the host apparatus 700 stores this e-mail in the database. 709 (step 207).

In this way, in the data transmission/reception system 1, the information terminal apparatus 100, etc. requests the cellular phone 200, etc. connected to send the telephone number data, acquires the telephone number data sent from the cellular phone 200, etc. and sends it to the host apparatus 700. Then, based on this telephone number data, the host apparatus 700 identifies the user who receives the e-mail. A telephone number is specific to each cellular phone and one telephone number is never given to a plurality of cellular telephones. Recently with the spread of cellular telephones in particular, more individuals personally own cellular telephones and one cellular phone is seldom owned by a plurality of individuals. One cellular phone is normally owned by a single user, and therefore it is possible to identify the user who owns this cellular phone 200 based on the telephone number data acquired from the cellular phone 200 connected. This eliminates the need for the user to enter a user ID or password individually, simplifying operations by the user.

It is only the cellular telephone I/F section 122 with a predetermined cable connected that needs to be added to the conventional information terminal apparatus, and therefore it is possible to reduce the cost compared to the case where an IC card for every user and card reader are required. Furthermore, since the telephone number given to the cellular phone 200, etc. is used instead of a user ID or password, it is possible to save time and trouble to control this information compared to the case where control is required to prevent the same user ID, etc. from being used by different users.

Furthermore, the information terminal apparatus 100, etc. analyzes the number of digits of a telephone number when the telephone number data received from the cellular phone 200, etc. is sent to the host apparatus 700 and if the number of digits is different from the number of digits of the current subscriber number system, the number of digits is converted to the number of digits of the current subscriber number system, which can prevent the inconvenience in the case where two registration information pieces are created to correspond to two telephone numbers which are substantially the same but differ in the number of digits.

Furthermore, since the information terminal apparatus 100, etc. and the host apparatus 700 are connected over a public line, there is a possibility that data will be leaked to a third party. However, the present invention carries out encryption processing when sending data between the information terminal apparatus 100, etc. and the host apparatus 700, and thus can prevent leaked data from being seen by a third party.

Moreover, while the host apparatus 700 identifies the user and decides whether user-addressed mail has arrived or not, the user must wait watching the display screen in front of the information terminal apparatus 100, etc., and so the present invention takes advantage of this time to show a predetermined advertisement, making it possible to show the user the content of the displayed advertisement efficiently and in this way attract the attention of the user on standby, providing a high advertising effect.

Figure 16:
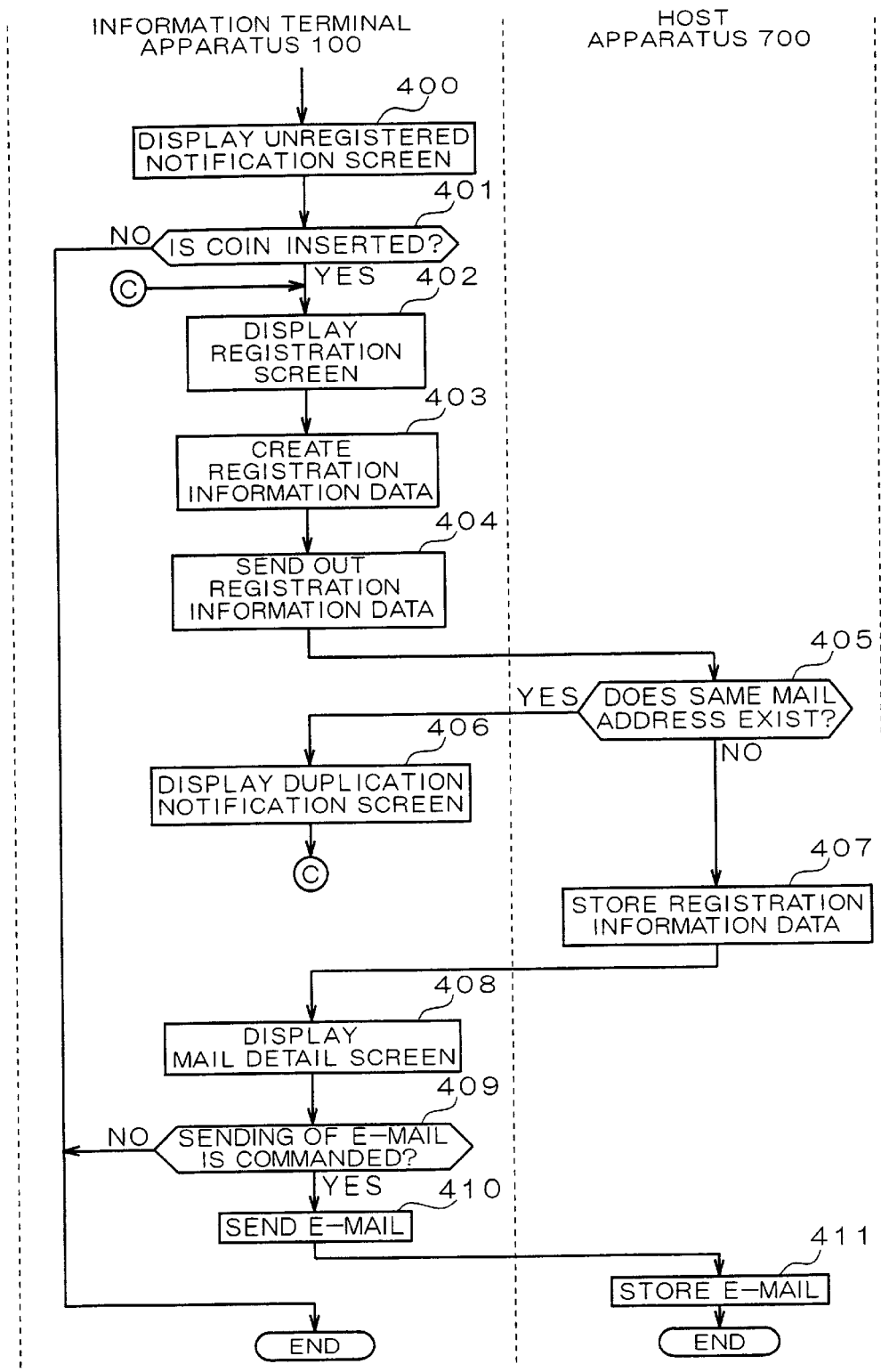
FIG. 16 is a flow chart showing a flow of an operation procedure of the data transmission/reception system when registering an unregistered user.

By the way, if no user is registered, the above embodiment ends a series of operations, but it is also possible to perform a process of registering the user. FIG. 16 is a flow chart showing an operation procedure of the data transmission/reception system 1 when registering unregistered user and shows operations of the information terminal apparatus 100 and the host apparatus 700.

Figure 17:
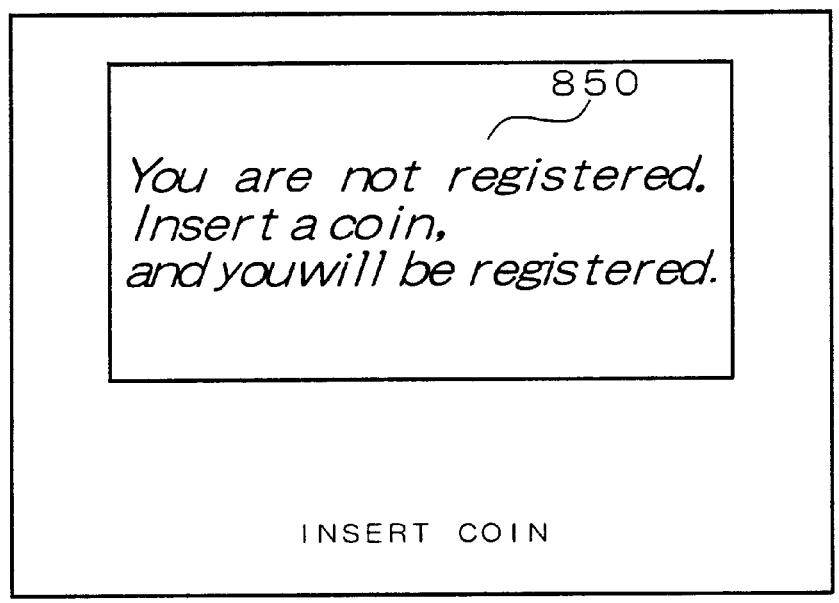
FIG. 17 illustrates another example of an unregistered notification screen.

If the CPU 702 in the host apparatus 700 decides that the user is not registered (when a negative decision is made in step 109 shown in FIG. 6), the CPU 102 in the information terminal apparatus 100 outputs a command to create an unregistered notification screen to the video generation circuit 110. In response to this command, the video generation circuit 110 creates an unregistered notification screen and displays it on the display apparatus 112 (step 400). FIG. 17 illustrates another example of the unregistered notification screen. As shown in FIG. 17, the unregistered notification screen includes a character string "You are not registered. Insert a coin and you will be registered" which is a message indicating that the user is not registered but can be registered now.

Figure 18:
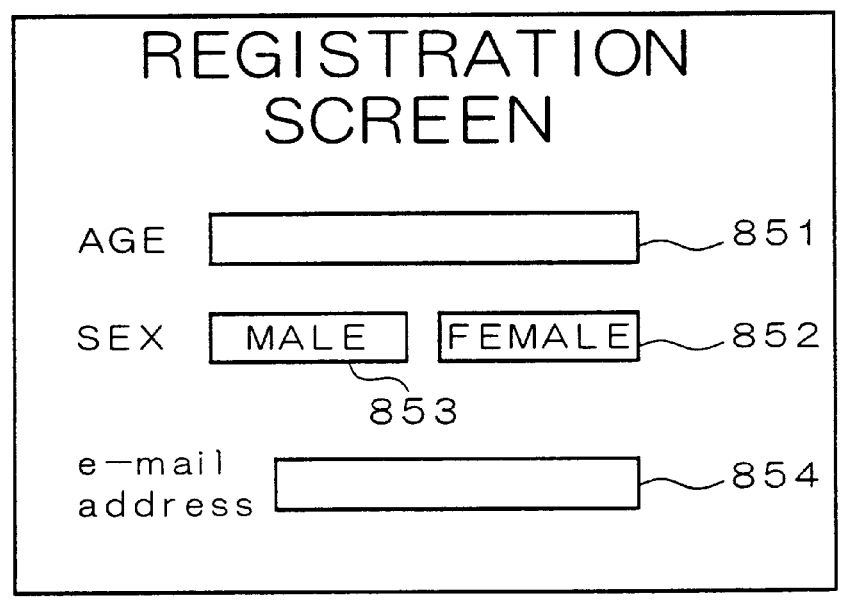
FIG. 18 illustrates an example of a registration screen.

Then, the CPU 102 decides whether a coin is inserted into the coin slot provided for the information terminal apparatus 100 (step 401). If no coin is inserted after a lapse of a predetermined time after the unregistered notification screen is displayed, a series of operations ends. If a coin is inserted within a lapse of the predetermined time after the unregistered notification screen is displayed, the CPU 102 outputs a command to create a registration screen to the video generation circuit 110. In response to this command, the video generation circuit 110 creates a registration screen and displays it on the display apparatus 112 (step 402). FIG. 18 illustrates an example of the registration screen. As shown in the figure, the registration screen includes an age entry field 851 to enter the age, sex selection buttons 852 and 853 to select the sex and a mail address entry field 854 to enter an e-mail address.

For example, if the user touches the age entry field 851 and mail address entry field 854 using the operation pen, etc., this touched position is detected by the input apparatus 118, a list of numbers and alphabets is displayed in an area of the registration screen. Selecting arbitrary characters from this list allows the age and the content of the e-mail address to be entered using the input apparatus 118. When the user touches one of the sex selection buttons 852 and 853 using the operation pen, etc., the user selects the sex using the input apparatus 118.

Then, the CPU 102 creates registration information data based on the various entered data such as the age, etc., and telephone number data acquired by the cellular phone 200 (step 403). The registration information data created has a configuration shown in FIG. 4 and the CPU 102 sends this registration information data to the host apparatus 700 (step 404).

Then, the CPU 702 in the host apparatus 700 compares the received registration information data with the other registration information data stored in the database 709 and decides whether more than one same e-mail address exists (step 405). The decision result is sent to the information terminal apparatus 100. Upon reception of the decision result that more than one same e-mail address exists, the CPU 102 outputs a command to create a screen to notify that more than one same e-mail address exists (duplication notification screen) to the video generation circuit 110. In response to this command, the video generation circuit 110 creates a duplication notification screen and displays it on the display apparatus 112 (step 406). Then, a series of operations after the display of the registration screen (step 402) is repeated.

If more than one same e-mail address does not exist, the CPU 702 stores the received registration information data in the database (step 407). Upon reception of the decision result that more than one same e-mail address does not exist, the CPU 102 outputs a command to create a mail detail screen to the video generation circuit 110. In response to this command, the video generation circuit 110 creates a mail detail screen and displays it on the display apparatus 112 (step 408).

After the mail detail screen is displayed, the CPU 102 decides whether the transmission of the created e-mail is commanded or not (step 409). If the user has ended operations without commanding the transmission of the e-mail, a series of operations ends. Furthermore, if the transmission of the e-mail is commanded, the CPU 102 sends the created e-mail (step 410). Upon reception of this e-mail, the CPU 702 in the host apparatus 700 stores it in the database 709 (step 411).

In this way, by enabling registration when the user is not registered, it is possible to register a new user and allow the user to carry out transmission/reception of e-mail. The above described CPUs 102 and 702, video generation circuit 110, display apparatus 112 and input apparatus 118 correspond to the registration information addition unit.

The present invention is not limited to the above embodiment, but can be modified in various manners without departing from the spirit and/or scope of the present invention. For example, the above embodiment describes the case where e-mail is transmitted/received, but the present invention is also applicable to a case where a game machine is connected to the host apparatus 700 as the information terminal apparatus 100, etc., a game result is stored in the host apparatus 700 as personal information, and later the game result is transferred from the host apparatus 700 to the game machine and the game is continued from the previous scene.

Figure 19:
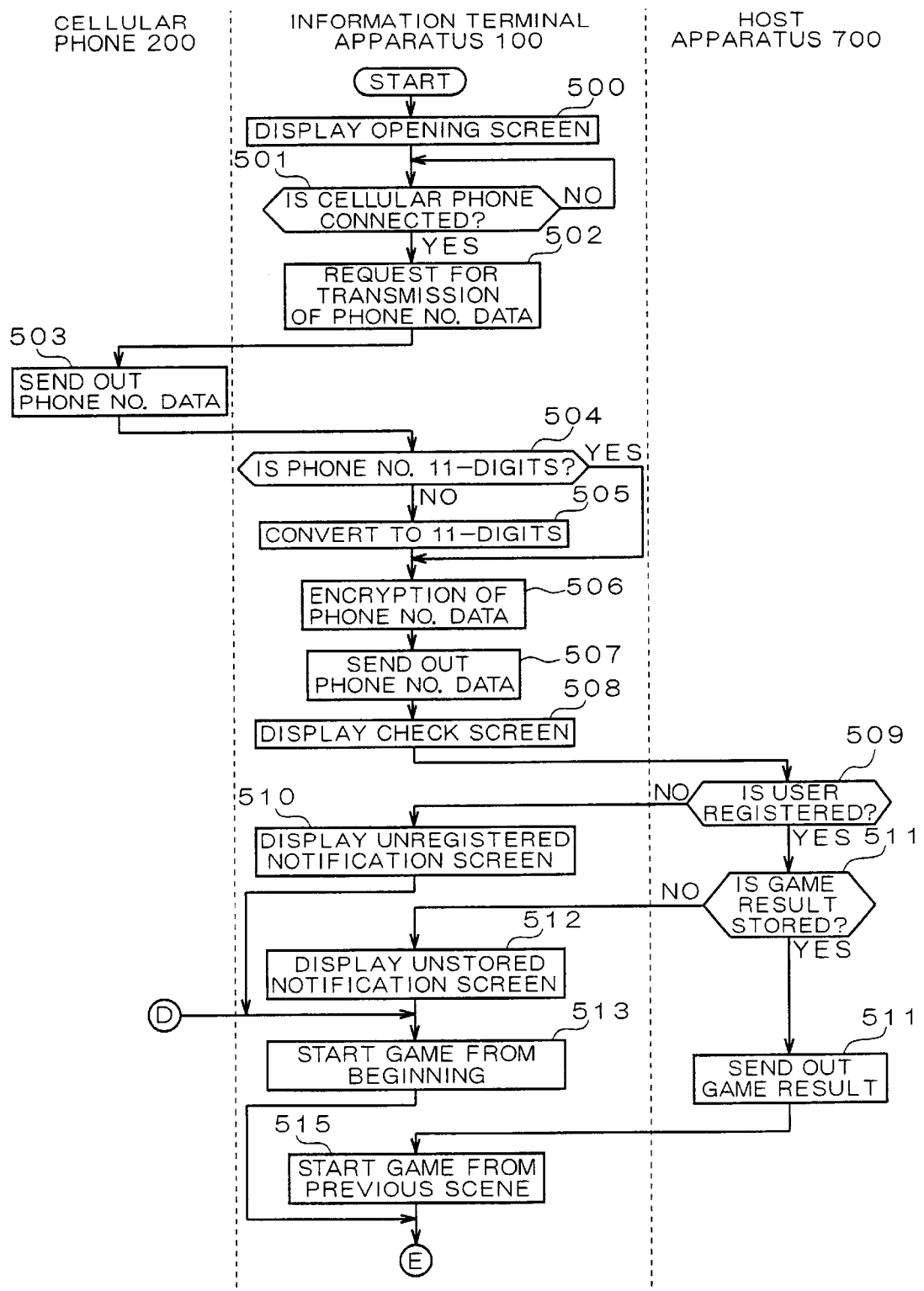
FIG. 19 is a flow chart showing a flow of an operation procedure of the data transmission/reception system when reading a game result.

FIG. 19 is a flow chart showing an operation procedure of the data transmission/reception system 1 when the information terminal apparatus is configured as a game machine and shows operations of the information terminal apparatus 100, cellular phone 200 and host apparatus 700 as the game machine.

The CPU 102 in the information terminal apparatus 100 outputs a command to create an opening screen to the video generation circuit 110. In response to this command, the video generation circuit 110 creates an opening screen and displays it on the display apparatus 112 (step 500). The opening screen shows a message urging the user to connect the cellular phone 200 and read the game result.

Then, the CPU 102 decides whether the cellular phone 200 has been connected or not (step 501). If the cellular phone 200 has not been connected after a lapse of a predetermined time after the opening screen is displayed, the CPU 102 carries out processing to start the game from the beginning (step 513). If the cellular phone 200 has been connected after a lapse of a predetermined time after the opening screen is displayed, the CPU 102 requests the cellular phone 200 to send the telephone number data (step 502).

In response to this transmission request, the cellular phone 200 sends the telephone number data to the information terminal apparatus 100 (step 503) and the CPU 102 in the information terminal apparatus 100 analyzes the received telephone number data and decides whether the number of digits of the telephone number is 11 digits or not (step 504).

If the number of digits of the telephone number is not 11 digits, the CPU 102 converts the telephone number to 11 digits (step 505). After deciding that the telephone number is 11 digits or after converting the telephone number to 11 digits, the CPU 102 carries out encryption processing on the telephone number data (step 506) and sends it to the host apparatus 700 (step 507).

Then, the CPU 102 outputs a command to create a screen to notify whether the game result of the user is stored or not (check screen) to the video generation circuit 110. In response to this command, the video generation circuit 110 creates the check screen and displays it on the display apparatus 112 (step 508).

Furthermore, the CPU 702 in the host apparatus 700 decides whether the user is registered or not based on the telephone number data received from the information terminal apparatus 100 (step 509). If the user is not registered, the CPU 702 sends the decision result to the information terminal apparatus 100. In response to this decision result, the CPU 102 outputs a command to create a screen to notify that the user is not registered (unregistered notification screen) to the video generation circuit 110. In response to this command, the video generation circuit 110 creates an unregistered notification screen and displays it on the display apparatus 112 (step 510). After displaying the unregistered notification screen, the CPU executes processing for starting the game from the beginning (step 513).

If the user is registered (when an affirmative decision is made in step 509), the CPU 702 decides whether the game result of the user is stored in the database 709 or not (step 511).

If the game result is not stored, the CPU 702 sends that decision result. Based on this decision result, the CPU 102 outputs a command to create a screen to notify that the game result is not stored (unstored notification screen) to the video generation circuit 110. In response to this command, the video generation circuit 110 creates an unstored notification screen and displays it on the display apparatus 112 (step 512). After displaying the unstored notification screen, the CPU 102 executes processing for starting the game from the beginning (step 513).

If the game result is stored (when an affirmative decision is made in step 511), the CPU 702 sends the game result (step 514). Based on this game result, the CPU 102 executes processing for starting the game from the previous scene (step 515).

Figure 20:
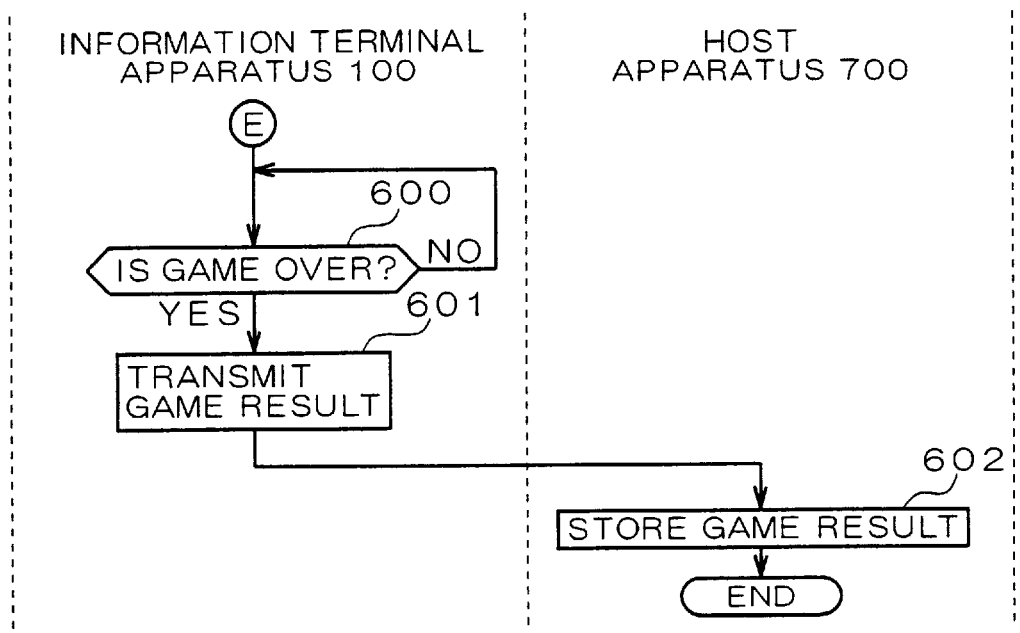
FIG. 20 is a flow chart showing a flow of an operation procedure of the data transmission/reception system when storing the game result.

FIG. 20 is a flow chart showing an operation procedure of the data transmission/reception system 1 when the game result is stored and shows an operation of the information terminal apparatus 100 and of the host apparatus 700, respectively.

The CPU 102 in the information terminal apparatus 100 decides whether the game is over or not (step 600) and when the game is over, executes processing for transmitting the game result (step 601). The CPU 702 in the host apparatus 700 executes processing for storing this game result in the database 709 (step 602).

In the above embodiment, the cellular telephone I/F section 122 sends a connection detection signal when the cellular phone 200 is connected and the CPU 102 decides that the cellular phone 200 is connected upon reception of this connection detection signal. However, it is also possible to display, for example, "Cellular phone connected?" etc. on the display apparatus 112 and carry out further processing (output a request for the transmission of the telephone number data to the cellular phone 200) only when the user selects the "Yes" button.

Moreover, it is also possible to include a user-set password in the registration information data and decide the authenticity of the user based on this password. For example, when receiving user-addressed mail, the information terminal apparatus 100 requests the user to enter the password and sends this password to the host apparatus 700 when the password is entered. The host apparatus 700 decides that the user is the authentic user only when the received password matches the password included in the user registration information and sends the user-addressed mail to the information terminal apparatus 100. As the method of entering the password, numerical buttons are displayed on the display apparatus 112 and the user selects these numerical buttons to enter the password or the user presses the push buttons of the cellular phone 200 to enter the password, and so on. Especially the case where the user enters the password by pressing the push buttons of the cellular phone 200, it is not necessary to provide an additional apparatus to enter the password, thus making it possible to reduce the cost.

In this way, by deciding the authenticity of the user based on the password, if a person other than the owner of the cellular phone 200, etc. attempts to illegally access the database 709, the access to the database 709 is not allowed because the password is wrong, which can further secure safety. It is also possible to leave the user himself/herself the decision to freely select whether the password is included in the registration information data or not, that is, whether or not to further secure safety.

Furthermore, the above embodiment describes the case where the telephone number data is acquired from the cellular phone 200, etc. connected to the information terminal apparatus 100, etc. via a predetermined cable, but it is also possible to make a call from the cellular phone 200, etc. to the host apparatus 700, etc. to send the telephone number data, instead of physically connecting these two apparatuses via a predetermined cable. However, in this case, if a call is made to the host apparatus 700, etc. user-addressed mail or game result is sent to the information terminal apparatus 100, etc. even if the user is not present in front of the information terminal apparatus 100, etc. Therefore, it is desirable to confirm that the user is in front of the information terminal apparatus 100, etc. For example, it is possible to generate a confirmation code randomly and let the user enter it.

Furthermore, in the above embodiment, the information terminal apparatus 100, etc. and the host apparatus 700 are connected over a public line, but they need not always be connected over a public line. For example, they can also be connected via a dedicated line or other communication network. Furthermore, the information terminal apparatus 100, etc. and the host apparatus 700 need not always be connected via a communication network, but, for example, the present invention can also be implemented with the information terminal apparatus 100, etc. and host apparatus 700 integrated in a single apparatus.

Furthermore, in the above embodiment, various data transmitted/received between the information terminal apparatus 100, etc. and the host apparatus 700 is encrypted, but it need not always be encrypted. For example, if the information terminal apparatus 100, etc. and the host apparatus 700 are connected via a private line, the probability that data will be leaked to a third party is extremely low, and so data need not be encrypted.

Furthermore, the above embodiment describes the case where the information terminal apparatus 100, etc. is used as a mobile communication apparatus, but the present invention can also be applied when other mobile communication apparatuses such as a PHS terminal and pager are used.

What is claimed is:

1. A personal identification system, comprising:

subscriber number acquiring unit for acquiring subscriber number data input from a mobile communication apparatus;

personal information storing unit for storing predetermined personal information; and user identifying unit for identifying a user who requests access to said personal information stored in said personal information storing unit based on said subscriber number data acquired by said subscriber number acquiring unit.

2. The personal identification system according to claim 1, wherein said user identifying unit identifies a user who demands to read personal information stored in said personal information storing unit.

3. The personal identification system according to claim 1, wherein said user identifying unit identifies a user who demands to write personal information to said personal information storing unit.

4. The personal identification system according to claim 1, further comprising registration information storing unit for storing predetermined registration information containing said subscriber number data, wherein said user identifying unit identifies a user by checking a subscriber number acquired by said subscriber number acquiring unit against a subscriber number contained in registration information stored in said registration information storing unit.

5. The personal identification system according to claim 4, further comprising registration information adding unit for adding, if said registration information corresponding to the user identified by said user identifying unit is not stored in said registration information storing unit, said registration information corresponding to this user.

6. A personal identification system, comprising:

subscriber number acquiring unit for acquiring subscriber number data input from a mobile communication apparatus;

personal information storing unit for storing predetermined personal information;

user identifying unit for identifying a user who requests access to said personal information stored in said personal information storing unit based on said subscriber number data acquired by said subscriber number acquiring unit; and subscriber number converting unit for converting, if the number of digits of said subscriber number data acquired by said subscriber number acquiring unit is different from the number of digits of the subscriber number system at that time, the number of digits of said subscriber number data to the number of digits of said subscriber number system.

7. A personal identification system, comprising:

an information terminal apparatus having subscriber number acquiring unit for acquiring subscriber number data input from a mobile communication apparatus; and a host apparatus connected to said information terminal apparatus via a network, having personal information storing unit for storing predetermined personal information and user identifying unit for identifying a user who requests access to said personal information stored in said personal information storing unit based on said subscriber number data acquired by said subscriber number acquiring unit.

8. The personal identification system according to claim 7, wherein said user identifying unit identifies a user who demands to read personal information stored in said personal information storing unit.

9. The personal identification system according to claim 7, wherein said user identifying unit identifies a user who demands to write personal information to said personal information storing unit.

10. The personal identification system according to claim 7, further comprising registration information storing unit for storing predetermined registration information containing said subscriber number data, wherein said user identifying unit identifies a user by checking a subscriber number acquired by said subscriber number acquiring unit against a subscriber number contained in registration information stored in said registration information storing unit.

11. The personal identification system according to claim 10, further comprising registration information adding unit for adding, if said registration information corresponding to the user identified by said user identifying unit is not stored in said registration information storing unit, said registration information corresponding to this user.

12. The personal identification system according to claim 7, wherein said information terminal apparatus further comprises personal information displaying unit for displaying, when said personal information corresponding to a user identified by said user identifying unit is read from said personal information storing unit, the content of this personal information.

13. The personal identification system according to claim 7, wherein said information terminal apparatus further comprises encrypting unit for encrypting data transmitted/received to/from said host apparatus.

14. The personal identification system according to claim 7, wherein said information terminal apparatus further comprises advertising information notifying unit for notifying advertising information taking advantage of awaiting time until data sent from said host apparatus is received.

15. A personal identification system, comprising:

an information terminal apparatus having subscriber number acquiring unit for acquiring subscriber number data input from a mobile communication apparatus;

a host apparatus connected to said information terminal apparatus via a network, having personal information storing unit for storing predetermined personal information and user identifying unit for identifying a user who requests access to said personal information stored in said personal information storing unit based on said subscriber number data acquired by said subscriber number acquiring unit; and subscriber number converting unit for converting, if the number of digits of said subscriber number data acquired by said subscriber number acquiring unit is different from the number of digits of the subscriber number system at that time, the number of digits of said subscriber number data to the number of digits of said subscriber number system.

* * * * *